United States Patent [19]

Iwashita et al.

[11] Patent Number: 4,674,034
[45] Date of Patent: Jun. 16, 1987

[54] DATA PROCESSING MACHINE SUITABLE FOR HIGH-SPEED PROCESSING

[75] Inventors: Masao Iwashita; Tsutomu Tenma, both of Tokyo, Japan

[73] Assignee: Nippon Electric Co. Ltd., Tokyo, Japan

[21] Appl. No.: 808,192

[22] Filed: Dec. 12, 1985

Related U.S. Application Data

[62] Division of Ser. No. 436,130, Oct. 22, 1982, Pat. No. 4,594,653.

[30] Foreign Application Priority Data

Oct. 22, 1981 [JP] Japan ............................. 56-169152
Dec. 14, 1981 [JP] Japan ............................. 56-201272
Jan. 12, 1982 [JP] Japan ............................. 57-2985
Jan. 26, 1982 [JP] Japan ............................. 57-10309

[51] Int. Cl.⁴ ..................... G06F 9/38; G06F 13/00
[52] U.S. Cl. ................................................ 364/200
[58] Field of Search ... 364/200 MS File, 900 MS File

[56] References Cited

U.S. PATENT DOCUMENTS 3,875,391 4/1975 Shapiro et al. ..................... 364/200
4,025,771 5/1977 Lynch, Jr. et al. ................. 364/200

OTHER PUBLICATIONS

John Gurd & Ian Watson, "Data Driven System For High Speed Parallel Computing–Part 2:Hardware Design", Computer Design, vol. 19, No. 7, Jul. 1980, Concord, pp. 97–106.

Primary Examiner—Eddie P. Chan
Attorney, Agent, or Firm—Sughrue, Mion, Zinn, Macpeak, and Seas

[57] ABSTRACT

A modular data processing unit includes first through fourth memories and an arithmetic unit all connected in a recirculating pipeline mode. An interface unit couples an external bus to the pipeline bus at a point between the arithmetic unit and first memory, and the fourth memory provides outputs to either the arithmetic unit or the interface unit. Data, instructions and addresses are transferred to the first memory via the interface unit, which addresses the second memory for storing instructions. In accordance with the output of the second memory, data is stored in the third memory. The arithmetic unit operates on the data in accordance with the instructions, and the fourth memory acts as a buffer for temporarily storing data while awaiting transfer to the arithmetic unit or interface unit. The transfer of data to the arithmetic unit from the fourth memory in addition to the transfer of data between modules, is controlled in accordance with the available storage capacity in the fourth memory. Data transfer can also be monitored between any two units to maintain the relative amounts of data transfer within predetermined limits.

2 Claims, 11 Drawing Figures

DATA PROCESSING MACHINE SUITABLE FOR HIGH-SPEED PROCESSING

This is a division of application Ser. No. 436,130, filed 10/22/82, now U.S. Pat. No. 4,594,653.

BACKGROUND OF THE INVENTION

The present invention relates to a data processing machine suitable for high-speed processing, and more particularly to a data processing machine fit for processing programs which must be processed through repeated executions of a certain operation flow.

There has been heretofore adopted a well known control flow mode in microprocessors. A basic process of this mode is such that a necessary instruction is fetched by accessing a memory, the fetched instruction is decoded to read out data and execute the processing specified by the instruction, and the result is stored in the memory. Such a process is sequentially repeated so as to process a set of program instructions. In order to use the processor of this kind in a field (e.g., image processing or voice processing) which requires high-speed processing, there have been attempts in the past to improve the operating speed of semiconductor devices used for the processor or to increase the number of bits treated in the processor at the same time. In the present situation, however, the former is limited due to difficulties in the semiconductor manufacturing technology and the latter leads to an increase in the size of the device and system and has a limit from the view point of economy.

Under the background as mentioned above, a pipe line mode has been proposed as an architecture adaptable to high-speed processing. This mode is based on parallel processing of data and is to control the respective operation flows (e.g., addition processing, subtraction processing, multiplication processing or division processing) for processing of programs in parallel. A processor system employing the pipe line mode is so structured that a plurality of arithmetic circuits each having a fixed single function, such as an adder or multiplier, are connected to each other in a ring form with a pipe line bus. This system is suitable for high-speed processing in that a plurality of operation flows can be executed in parallel. It is necessary, however, to select the kind of arithmetic circuits to be used and determine the sequence of the selected arithmetic circuits optimum for the given processing. Therefore, the operation system thus structured can produce an effect of the pipe line mode for the given processing, but has a defect that the performance is significantly reduced for other types of processing. Such reduction in the performance can be compensated to some degree by independently preparing the operation systems in accordance with the respective processings, but the kinds of required arithmetic circuits are increased and the system structure is enlarged, thus resulting in a great increase in cost.

Furthermore, computing time in each pipe line, that is, a period of time necessary for data to be input to the pipe line and then output therefrom, is fixed and the individual pipe lines have different computing times from one another. As a result, in the case where a plurality of processors of the pipe line mode are used to constitute a so-called multiprocessor, timing control of data transfer between the processors becomes very complicated. In addition, according to the conventional pipe line mode processor, it is difficult to cause processing to be looped within a pipe. Stated differently, processing can not be executed repeatedly wihin a single pipe line, so that such processing has required intricate software control and a prolonged processing time.

Meanwhile, in fields requiring high-speed processing (e.g., image processing adapted to process images from satellites or of X-ray photographs by a man-machine system), a large amount of data up to about 6 million pixels for each image has to be processed in a short period of time. For instance, to process one image in 3 seconds, the image has to be processed at a speed of 500 ns per 1 pixel. It is required, therefore, that the processor itself has a function to permit high-speed processing and that data transfer between the processor and the memory can be performed at a high speed. Particularly, the latter is a major problem for the conventional microprocessor in which the memory is accessed by using a program counter. As mentioned above, such a prior microprocessor is operated in the control flow mode where the program counter is employed as an address specifying means to fetch instructions from the memory and the fetched instructions are decoded so as to process data. Consequently, such a microprocessor is not suitable for high-speed processing because of the increased number of memory accesses.

To the contrary, a data flow mode in which data is caused to flow through a bus, a certain arithmetic circuit takes out the data and the result is fed to the next arithmetic circuit through the bus, has a reduced number of memory accesses and hence is fit for high-speed processing. This mode is characterized in that predetermined arithmetic processings are carried out along the bus, so that data is transferred while being treated sequentially and the final result is obtained at the end of the bus. In the data flow mode, however, it is difficult to control a flow of data and make coupling with the prior microprocessor. Therefore, the operation results do not meet expectations in repetitive operations, parallel processing or composite processing using a common bus. In other words, the data flow mode has a disadvantage such that it is not useful in the art of image processing including a number of those processings which do not require such high speed.

SUMMARY OF THE INVENTION

An object of the invention is to provide a data processing machine which can process a large amount of data at a high speed.

Another object of the invention is to provide a data processing machine which can easily control the designation and changing of operations to be processed.

Still another object of the invention is to provide a data processing machine which can execute the designated operation repeatedly.

Still another object of the invention is to provide a novel microprocessor of modular type which can be easily coupled to a bus, and particularly which is coupled to a common bus to permit data transfer with respect to the general microcomputer.

Still another object of the invention is to provide a processor in which an internal bus is coupled with an improved pipe line system, particularly in which a processing time in a pipe is variable.

Still another object of the invention is to provide a processor in which executing a sequence of operations is controlled with an improved data flow mode, and particularly which is suitable for parallel processing or composite processing.

Still another object of the invention is to provide a novel processor in which the data flow mode and the pipe line mode are organically combined so as to obtain the respective advantages thereof in an additive manner.

Still another object of the invention is to provide a data processing machine which is so structured that extensions can be realized with ease and the performance is improved in proportion to such extensions.

Still another object of the invention is to provide a novel parallel processing system in which a plurality of programmable microprocessors are coupled to each other via a common bus.

Still another object of the invention is to provide a processor which can self-control input and output timing of information.

Still another object of the invention is to provide a processor which can control an amount of data to be input and an amount of data to be output.

Still another object of the invention is to provide a data processing machine which is fit to execute a program including a number of processings that require changes to a relatively small degree.

Still another object of the invention is to provide a novel microprocessor in which coupling between data to be treated and the associated instructions is separated on the program.

Still another object of the invention is to provide a data processing machine which does not require the release of an incomplete data during the predetermined arithmetic processing sequence.

Still another object of the invention is to provide a data processing machine which can not only eliminate useless data but can also bypass irrelevant data.

Still another object of the invention is to provide a data processing machine which has a copying function for easily producing the same data any desired number of times.

Still another object of the invention is to provide a data processing machine which has a branching function for changing processing in accordance with data or the results of an operation.

Still another object of the invention is to provide a microprocessor which can perform a loop operation therein.

Still another object of the invention is to provide a microprocessor which can detect the number of input data.

Still another object of the invention is to provide a micro processor which can control a flow rate of data and is able to prevent an internal memory from falling into the overflow state.

Still another object of the invention is to provide a data processing machine which can execute processing and transfer of data in parallel through an internal ring and an operation ring and which can also permit data transfer to and from other processors through an external ring.

Still another object of the invention is to provide an information processing machine which can control an outflow of information from the inside and an inflow of information from the outside in accordance with capacity of the memory.

Still another object of the invention is to provide a data processing machine in a system which performs identification of the treated data using identification information, wherein data is caused to flow in the same sequence with respect to the data having the same identification information.

Still another object of the invention is to provide a microprocessor of modular type which can perform vector operations by using the pipe line mode with a variable length.

Still another object of the invention is to provide a data processing machine which can preset the desired operation sequence in a programmable manner without changing the kind of any arithmetic unit and arrangement thereof.

A data processing machine according to the present invention comprises a first memory for storing destination addresses of data, a second memory for story instructions, a third memory for storing the data, a fourth memory allowing the data from the third memory to wait for another, an arithmetic means for arithmetically processing the data output from the fourth memory, bus means for coupling these memories and the arithmetic means into a ring form, and an interface means coupled to the bus, the second memory being accessed with the destination addresses output from the first memory and the arithmetic means being controlled in accordance with the accessed instructions.

The present invention is characterized in that the arithmetic means and the first to fourth memories are formed in a pipe line mode, the instructions input through the interface means are stored in the second memory, and arithmetic processsing for data flowing through the bus means is executed in the arithmetic means in accordance with instructions which are fetched from the second memory.

As a result, it becomes possible to effectively execute such pipe line processing with the sequence of operations being controlled in the data flow mode within the ring. Particularly, the sequence of operation can be programmably controlled in accordance with the arranged instructions in the second memory, so that various operations may be desirously executed without changing the kind of any arithmetic unit and arrangement thereof or increasing the number of units.

Moreover, the ring includes therein the third and fourth memories allowing data to wait, so that both data flows within the ring and out of the ring may be controlled effectively. Therefore, both processings inside and outside of the ring do not require synchronous timing control based on a common clock and they can be executed in an asynchronous relation therebetween, while data transfer between both processings can be performed under precise timing control.

Further, the arithmetic part and the memory part are connected to each other into a ring through the bus means, so that loop operation or repetitive operation may be executed any number of times without temporarily sheltering data out of the ring. Thus, it is possible to optionally change a processing time or the number of operation stages in the ring.

In addition, there is no need for data to be sheltered out of the ring before a determined processing sequence will be completed, or for memories outside of the ring to be accessed during the determined processing sequence, so that data processing may be carried out at an extremely high speed.

Hardware of a data processing machine according to the present invention will be described in more detail hereinafter.

The data processing machine of this invention basically comprises a memory part capable of reading and writing, an arithmetic circuit part for selectively executing various operations, and an interface part for controlling data transfer to and from the outside.

The memory part includes therein a transfer table memory (first memory) for storing destination addressses of data, a parameter table memory (second memory) being accessed with the addresses in the first memory and storing predetermined instructions, a data memory (third memory) for temporarily storing one half of the input data for dyadic operation, and a queue memory (fourth memory) waiting for data to be processed by an arithmetic circuit.

The arithmetic circuit part includes therein a processor unit for performing dyadic operation or monadic operation, and a parameter table memory adapted to generate, extinguish and branch the data, to generate addresses for the data memory, to count the number of incoming data and to perform dyadic control.

Moreover, there is also included an interface, and these members are correlated with one another as below.

The present data processing machine is realized by such an architecture that the transfer table memory for storing destination addresses of data, the parameter table memory being accessed with the destination addresses and storing instructions, the data memory for temporarily storing one half of the input data for dyadic operation, the queue memory allowing the data from the data memory to wait, and the processor unit performing dyadic or monadic operation for output from the queue memory and outputting the result to the transfer table memory, are connected with a bus in a ring form, the bus is connected to a bus interface for controlling data transfer to and from an external bus, and the processor unit is operated in accordance with the instructions which have been desirously set in the parameter table memory at the time of initial setting.

The foregoing architecture has such features as follows.

Firstly, the arithmetic circuit part with multi-functions is concentrated in the processor unit.

Secondly, the transfer table memory, the parameter table memory, the data memory, the queue memory and the processor unit are coupled to each other into a ring by bus means.

Thirdly, operation control in a data flow mode can be executed within a ring using the initially preset parameter table memory and data memory.

Fourthly, there is included the bus interface for performing data transfer to and from external circuits or other external machines.

Therefore, it is possible to obtain a data processing machine in which each block can be easily arranged into one module and the performance is improved just by coupling a plurality of identical modules in series, corresponding to the number of coupled modules. In particular, when connecting two modules, it is enough only to wire an input terminal of one module with an output terminal of the other module. Furthermore, both the pipe line mode and data flow mode are combined so as to produce their merits in an additive manner, thus providing a high-speed processing processor adaptable widely for various purposes.

BRIEF DESCRIPTION OF THE DRAWINGS

The above object and other objects, features and advantages of the present invention will become apparent from the following description of preferred embodiments thereof taken in conjunction with the accompanying drawings.

DETAILED DESCRIPTION OF THE INVENTION

Figure 1:
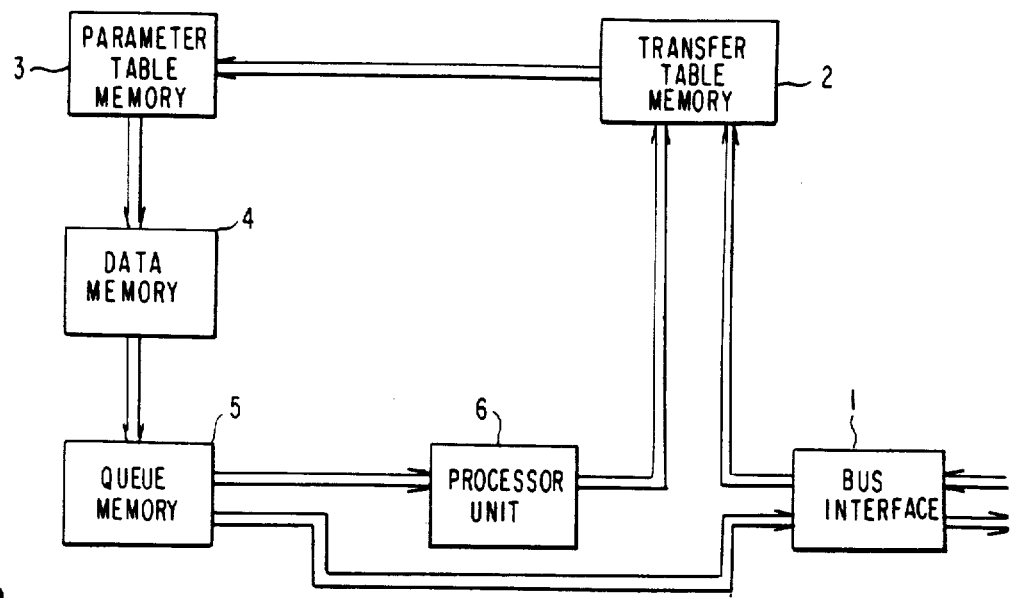
FIG. 1 is a block diagram of a data processing machine according to one embodiment of the invention.

Preferred embodiments of the present invention will now be described in detail with reference to the accompanying drawings. FIG. 1 shows a block diagram of a data processing machine according to one embodiment of the invention. A bus interface (BI) 1, transfer table memory (TT) 2, a parameter table memory (PT) 3, data memory (DM) 4, queue memory (QM) 5 and a processor unit PU) 6 are arranged into one module.

As shown in the drawing, the transfer table memory 2, para meter table memory 3, data memory 4, queue memory 5 and the processor unit 6 are connected in due sequence with a pipe line bus so as to form a ring shape.

Input/output data transferred to and from external circuits includes module number setting data, template setting data, template reading data, data memory setting data, data memory reading data, resetting data, ineffective data, passing data, executing data, error status data, and processing data.

The module number setting data comprises only the module number and is to set the module number into a module number register within the bus interface 1 when reset. After setting the module number into the module number register, the content of the module number register remains unchanged until a reset signal will become newly active. The content of the module number register is compared with the module number of data taken into the processing module of the present invention after resetting.

The template setting data comprises the module number, address for the transfer table memory 2, a data value written into the transfer table memory 2, an address for the parameter table memory 3 and a data value written into the parameter table memory 3.

The template setting data is to set template data into the transfer table memory 2 and the parameter table memory 3. The template data includes, e.g., data representing the content and procedure of processing and is normally transferred into the processing module as shown in FIG. 1, that is, into the transfer table memory 2 and the parameter table memory 3, from an outside host processor at the start of operation of a program.

The template reading data comprises the module number, an address for the transfer table memory 2 and an address for the parameter table memory 3. The template reading data is to read the template data set in the transfer table memory 2 and the parameter table memory 3. There is used the number of the module which is intended to read the template data therefrom. Moreover, the template reading data can be utilized to check the content of the template data in the event there occurs an error. The readout template data is outputted to the external circuit, with the module number being replaced with the specified module number (e.g., 1) in order to discriminate it from other data.

The data memory setting data comprises the module number and a data value, which value is written into the data memory 4. Addresses used for writing the data value into the data memory 4 are generated from the parameter table memory 3 while being sequentially incremented one by one from 0. The data memory reading data comprises the module number and an address for the data memory 4. The data memory reading data is to access the data memory 4 with the address for the data memory 4 included therein and to output the readout data value to the external circuit. The resetting data comprises only the module number and is used to release the error state after there has occurred such a state within the processing module of FIG. 1. The error state results from an overflow error in the queue memory 5. If this error occurs, the data input to the bus interface 1 is not taken into the processing module and is extinguished. However in the case where the resetting data is input to the bus interface 1, the error state is released and normal processing will be continued after that. Other than the above function to reset the error state, the resetting data has another function to initial ize the state within the processing module, that is, to clear counters and memories included therein. The resetting data disappears within the bus interface 1.

The ineffective data comprises only the specified module number (e.g., 0). This data will disappear within the bus interface 1, even if it should be input to the processing module shown in FIG. 1.

The passing data represents data including therein the module number which does not coincide with the content of the module number register set at the time of resetting, and does not constitute the ineffective data or the module number setting data. The passing data directly passes through the bus interface 1 and is then output to the external circuit. The executing data comprises the module number, an address for the transfer table memory 2, a control bit, a code bit and a data value. The control bit will be set when the result of operation in the processor unit 6 coincides with the designated condition. In the case where the control bit is set, the address in the transfer table memory 2 is changed upon the designation of a branching instruction by the processor unit 6. Stated differently, in such a case the data will be processed in a manner different from the data where the control bit is not set. With the branching instruction not being designated, no change of processing will occur so that the control bit and the branching instruction are normally used as a pair. The branching instruction is used to change the flow of processing in accordance with the operation result. The error status data comprises the module number and error status. The error status data has a function to inform the external circuit of the occurrence of the error, when there occurs an overflow error in the queue memory 5 within the processing module. The module number included in the error status data corresponds to the read-out content of the module number register set within the module which has been subject to the error.

The processing data comprises the module number, address for the transfer table memory 2, a control bit, a code bit and a data value. The processing data makes reference to the transfer table memory 2 and the parameter table memory 3. As a result, upon the presence of an output instruction, the processing data is added with an address for the transfer table memory 2 and the module number obtained by referring to the transfer table memory 2 and the parameter table memory 3, and is then output to the external circuit.

Hereinafter there will be described in detail a flow of data through the pipe line bus. The executing data comprises the module number, an address for the transfer table memory 2, a control bit, a code bit and a data value. This data is taken into the pipe line bus from the external circuit via the bus interface 1 and is then sent to the transfer table memory 2. The data is allowed to be input from the external circuit into the processing module only on such conditions that the processor unit is not under output operation, the number of data stored in the queue memory 5 is less than a certain value (e.g., 16 data), and the module number included in the input data coincides with the content of the module number register which has been taken therein at the time of resetting. The data input from the external circuit to the bus interface 1 is provided with a use bit within the bus interface 1 and is then sent to the transfer table memory 2. The transfer table memory 2 receives data from the bus interface 1 or the processor unit 6. The data input to the transfer table memory 2 comprises a data value, address for the transfer table memory 2, a use flag and a template flag. The use flag is to indicate whether the data is effective or ineffective. The transfer table memory 2 checks both use flags of output data from the processor unit 6 and the bus interface 1, and then takes therein the data with its use flag assuming a "1". In case both use flags are "1", the output data from the processor unit 6 is taken in with priority. The data in such a case where both use flags are "0", will turn to ineffective data. This ineffective data passes through the transfer table memory 2, parameter table memory 3 and the data memory 4, and then it disappears before reaching the queue memory 5.

With the use flag assuming "1" and the template flag assuming "0", the transfer table memory 2 judges the input data as normal processing data, so that the transfer table memory 2 is accessed with the address for the transfer table memory 2 and then the read-out data is sent to the parameter table memory 3. With the use flag assuming "1" and the template flag assuming "1", the data is written into and read out from the transfer table memory 2 with the control bit. The data written into the transfer table memory 2 comprises information to discriminate processings before and after the reference to the transfer table memory 2, and information to discriminate paired components from each other when addresses used for newly referring to the transfer table memory 2, addresses used for referring to the parameter table memory 3 and the data sent to the parameter table memory 3 are operated as a pair, respectively, after data processing in the processor unit 6.

The parameter table memory 3 receives the address for the parameter table memory 3, which is included in the data read out from the transfer table memory 2. The parameter table memory 3 mainly stores therein codes of instructions. Such codes include information to control data exchange where two data are operated as a pair, code information to designate the number of output data, the module number attached to the data taken out to the external circuit and the content of processing in the processor unit 6, and information for supervising the states such as reading or writing of the data memory 4, dyadic queue control of data or flow rate control thereof. Writing of data into the parameter table memory is effected when the template flag is set, and the data is divided into permanent information the content of which remains unchanged during normal processing and temporary information which constitutes address information for the data memory 4.

The parameter table memory 3 receives the use flag, template flag, control bit, instruction code and a data exchange signal from the transfer table memory 2, and it outputs a write enable signal to the data memory 4. The data memory 4 is used for storing the data having reached in advance, which data is allowed to temporarily wait until the remaining data for dyadic operation (i.e., the operation using two kinds of data as input ) arrives. The data memory 4 is further used for storing a constant used for constant operation, a look up table, a transition table for processing the transition of state, and input/output data. The write enable signal for the data memory 4 is sent from the parameter table memory 3. When the two data for dyadic operation have reached the data memory 4, data is read out from the parameter tale memory 3 and then the two data are outputted to the queue memory 5 according to the instruction of a dyadic operation.

The queue memory 5 cmprises a data queue and a generator queue. The data queue serves as a memory for temporarily holding data in the case where the processor unit 6 outputs the plural number of data or receives data from the bus interface 1, because the processor unit 6 becomes busy and is unable to input any more data at that time. The generator queue receives starting data for generating a numerical value, the number of generated data and control information from the data memory, and it outputs data to the processor unit 6 upon checking the information indicative of whether or not the data queue has a vacant space more than a predetermined value (a half of the capacity of the data queue in this embodiment).

The processor unit 6 comprises arithmetic circuits which have various functions to permit arithmetic operation, logical operation, shift, comparison, bit inversion, priority encoding, branching, generation of numeric value, and copying. The bit inversion means such processing as providing an output data value which has an inverted bit position with respect to an input data value. In the priority encoding, a value of each bit included in the input data value is sequentially checked from a bit with highest priority to a bit with lowest priority. As a result of this check, the bit position at which the first "1" occurs is indicated in the form of binary integer and this is turned into the output data value.

The branching performs such processing that upon checking the control bit, the address for the template memory 2 included in the input data is directly output as the address for the template memory 2 included in the output data with the control bit assuming "0", while the address obtained by incrementing the address for the template memory 2 included in the input data is output as the address for the template memory 2 included in the output data with the control bit assuming "1".

The generation of a numeric value is a process which checks a data value in the input data, the number of generations and an increment value, then adds the increment value to the data value in the input data corresponding to the number of generations. This function is used in the case of repetitive processing or where there is a need to generate addresses for the memory. On this occasion, the address for the transfer table memory 2 in the output data remains unchanged and the address for the transfer table memory 2 in the input data is directly output.

The copying is process wherein a data value in the input data and the number of copying are checked and the data value in the input data is directly copied into the output data corresponding to the number of copyings. At this time, the address for the transfer table memory 2 included in the output data assumes a value which is obtained by incrementing the address for the transfer table memory 2 in the input data one by one in a sequence of outputs.

The number of input data to the processor unit 6 is one or two, while the number of output data can be designated to have a range of 1 to 16. Processing where the number of input data is one is called monadic operation (or monomial operation), and processing where the input data is two is called dyadic operation. In the case of monadic operation, it is not necessary to provide any waiting because the number of input data is one, while in the case of dyadic operation (or binomial operation), the data having reached in advance is stored in a dyadic queue within the data memory for waiting because it is impossible to execute the operation until both data are completely present. More specifically, when the delayed data has arrived, it is sent to the processor unit 6 through the queue memory 5 together with the former data read out from the dyadic queue within the data memory. In other words, the dyadic operation will be subject to execution control in a data flow mode. When the number of output data is two or more, a busy flag is set during output so as to inhibit the data to be input from the queue memory 5.

Figure 2:
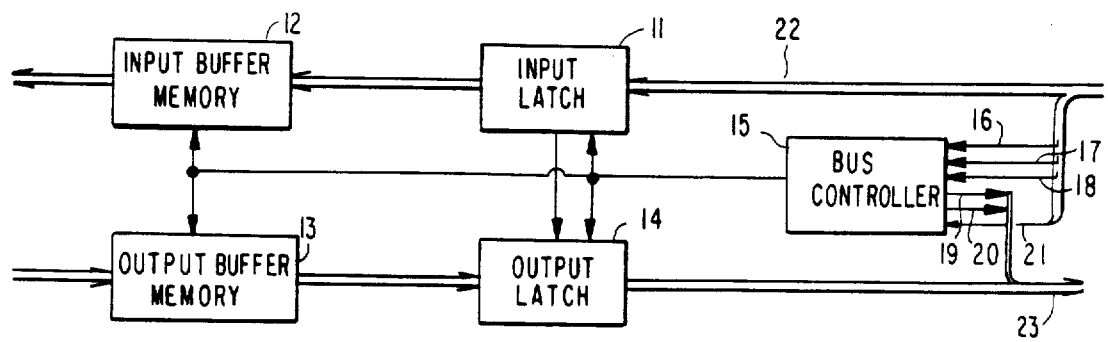
FIG. 2 is a block diagram showing one embodiment of a bus interface in FIG. 1.

FIG. 2 is a block diagram showing the bus interface 1 in FIG. 1 in more detail. In the drawing, the reference numeral 11 denotes an input latch, 12 denotes an input buffer memory, 13 denotes an output buffer memory, 14 denotes an output latch, 15 denotes a bus controller, 16 denotes a reset signal, 17 denotes a clock signal, 18 denotes an input demand signal, 19 denotes an input permission signal, 20 denotes an output demand signal, 21 denotes an output permission signal, 22 denotes an input bus, and 23 denotes an output bus. When the reset signal 16 is active, the processing module is initialized. As the time of rising of the reset signal 16, data on the input bus 22 is taken into a module number register within the input latch of the bus interface included in the processing module. When the reset signal 16 is not active, the data is input and output in a normal manner. With the input demand signal 18 being active, data on the input bus 22 is taken into the input latch 11. In the case where the module number included in the data latched by the input latch 11 coincides with the content of the module number register, the data is taken into the input buffer memory 12, while in the case of not meeting such coincidence, the data is passed to the external circuit through the output latch 14. The data having the specified module number (e.g., the module number 0) is treated as ineffective data. More specifically, in the case where the module number included in the data latched by the input latch 11 coincides with the specified module number, the latched data is assumed as ineffective data and then will disappear within the input latch 11. A use flag is added to the data which is transferred from the input latch 11 to the input buffer memory 12.

When inputting data from the external circuit into the processing module, the input demand signal 18 is made active and the input data is fed to the input bus 22. Within the processing module, the input demand signal 18 is sampled synchronously with the clock signal 17. In the presence of an input demand and with input being permissible, the sampled data is latched into the input latch 11 irrespective of the module number on the input data. Then, the input permission signal 19 is made active and the external circuit is informed that the data on the input bus 22 has been taken in. The input buffer memory 12 is to receive data from the input latch 11 and to temporarily store it therein.

Figure 5:
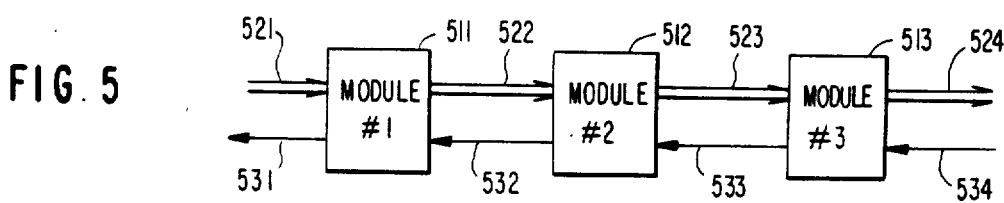
FIG. 5 is a block diagram of a system which is structured by connecting in series the data processing machines according to one embodiment of the invention.

The output buffer memory 13 is to receive data from the data queue within the queue memory 5 of FIG. 5 and to store data which is to be output to the external circuit through the output latch 14. In the output latch 14, priority is given to the output data of directly passed through the processing module, so that the processed output data serves to latch the data from the data queue in the absence of such passing data. If the data includes neither directly passing data nor processed output data, the data is combined with the module number allocated to ineffective data and is then output to the external circuit as ineffective data.

As mentioned above, the designated operation will be executed with blocks coupled into a ring shape. Within the ring it is possible to perform not only pipe line processing but also repetitive operation such as a copy operation. Moreover, data is not required to be taken out of the ring during its processing, thus permitting high-speed processing. In addition, there are included a write enable parameter table memory and a transfer table memory, so that the kind of operations and the sequence thereof may be selected desirously. It becomes possible, therefore, to effect pipe line processing with variable length. The same operation can be executed for different data without changing the memory content, thus permitting the execution of advanced processings such as vector operation with ease and at a high speed.

Hereinafter there will be described in more detail the queue memory which has an important role as an output timing control mechanism for the data read out to an external bus through the bus interface. As mentioned above, when it is not possible to output the data to the external bus, the result of the operation processed within the ring is stored into the queue memory in sequence. Accordingly, if the operation results continue to be formed in the state where the queue memory issues no output, there may occur an overflow. In the event the queue memory allowing the data to wait for another is subject to an overflow of data, this overflow has to be detected thereby to perform error processing. The overflow error is a fatal error, so that even if the execution is started once again, the system will soon fall into an overflow error. Consequently, it is impossible to eliminate such error until a flow of the data is changed. There may be proposed such a method as one solution that the software has been arranged in advance to form a flow of data which will never produce the overflow error. However, this method is very difficult practically and, in the case there occurs an error as a result of a trial execution, it is necessary to repeat such a procedure that a flow of data is changed and then the execution is started once again. This procedure leads to a great burden for users. Moreover, when control data for controlling a flow of data is used to effect complete control, the number of control data is increased and is no longer negligible in comparison with the number of processing data, thus resulting in the reduced performance of the entire data processing machine.

Meanwhile, a processing speed is increased by executing the processing within the module independently of, that is, asynchronously with that on the outside, so that it is not appropriate to monitor the overflow error in the queue memory from the outside. Therefore, the overflow is required to be prevented within the module before it happens. Preferably, a hardware circuit should be used to realize this.

According to the present invention, there is included such a mechanism that an amount of data stored in the queue memory is monitored at all times and read-out from the queue memory is controlled in accordance with the amount of data, thereby to prevent an overflow in the queue memory.

More specifically, the queue memory is provided with a queue memory control circuit for constantly monitoring the amount of data stored in the queue memory, and an overflow is prevented before it happens by temporarily forbidding read-out from the queue memory or changing the priority sequence of read-out from the queue memory in the event the sum of the monitored amount of data and an amount of data generated at one time exceeds the capacity of the queue memory. In other words, the present invention also provides a queue memory comprising a data queue memory allowing the data with no possibility of generation to wait for another, a generator queue memory allowing the data with a possibility of generation to wait for another, a counter for counting an amount of data stored in the data queue memory, a register for storing an upper limit value for the amount of data to be stored in the data queue memory, and a comparator for judging whether the value of the counter exceeds the value of the register or not, read-out from the data queue memory and the generator queue memory being selectively controlled in accordance with the compared results from the comparator.

The queue memory (QM) includes therein the data queue (DQ), the generator queue (GQ) and an output queue (OQ), and further is composed of a counter for counting an amount of data stored in the queue memory, a comparator for judging whether the value of the counter exceeds a difference of [(capacity of the queue memory)—(the maximum value of data generated at one time by the generator)] or not, and a control circuit for controlling read-out from the queue memory.

Figure 3:
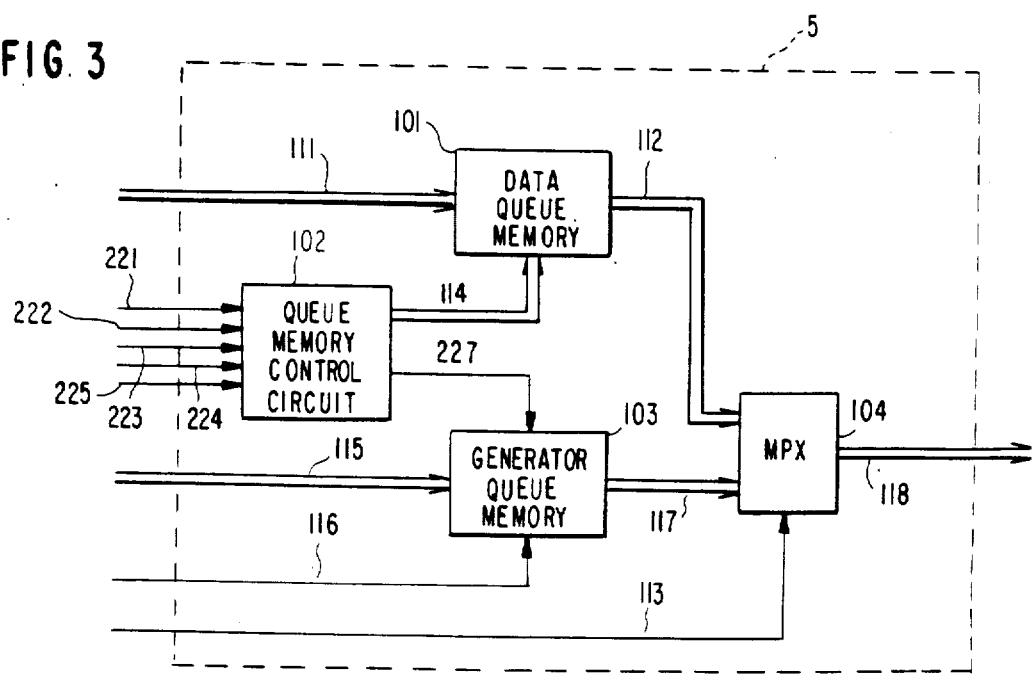
FIG. 3 is a block diagram showing one embodiment of a queue memory in FIG. 1.

FIG. 3 shows a block diagram of one embodiment of the queue memory. The queue memory shown in FIG.

3 can replace of the queue memory 5 used in the data processing machine of FIG. 1.

Firstly, functions of the data queue and the generator queue housed in the queue memory will be described by referring to FIG. 1. The data queue serves as a memory for temporarily holding input data when the processor 6 outputs a plurality of data to or receives data from the bus interface 1, because the processor unit 6 becomes busy and is unable to receive any more input data at that time. The generator queue serves as a memory adapted to receive starting data for generating a numerical value, the number of generated data and control information from the data memory, and it issues an output to the processor unit 6 upon checking the information indicative of whether or not the data queue has a vacant space more than a predetermined value (a half of the capacity of the data queue in this embodiment).

As mentioned hereinbefore, the processor unit 6 performs not only processing where the number of input data is one (i.e., monadic operation) but also processing where the number of input data is two (i.e., dyadic operation). In the case of monadic (monomial) operation, waiting is not required because the number of input data is one, while in the case of dyadic operation, the data having reached the data memory in advance is stored in a dyadic queue within the data memory for waiting purposes because it is impossible to execute an operation until both data are completely present. More specifically, when the delayed data has reached the data memory after the waiting period, it is transferred to the processor unit 6 through the queue memory 5 together with the former data read out from the dyadic queue within the data memory, and thereafter the dyadic (binomial) operation will be started. When the number of output data is two or more, a busy flag is set by the processor unit 6 during a period of output thereby to forbid the data to be input from the queue memory 5. The data output from the queue memory 5 includes therein:

(1) data to be output to the external circuit,
(2) data which will disappear,
(3) data having reached in advance in the case of operation with respect to two input data (i.e., dyadic operation),
(4) data producing plural trains of data,
(5) data to be copied, and
(6) data producing two data output as a result of operation.

Among them, the number of data is reduced in cases (1), (2) and (3), while the number of data is increased in cases (4), (5) and (6).

Particularly, the number of data is greatly increased in cases (4) and (5), so that it is effective to control the data in such cases for the purpose of preventing an overflow in the queue memory.

This control will be now described by referring to FIG. 3. In the drawing, the reference numeral 101 denotes a data queue memory, 102 denotes a queue memory control circuit, 103 denotes a generator queue memory and 104 denotes a multiplexer. The numeral 111 denotes data written into the data queue memory 101, that is, data which is output from the data memory 4 shown in FIG. 1 and input to the data queue memory 101. The numeral 112 denotes data which is read out from the data queue memory and then input to the multiplexer 104. The numeral 114 denotes a control signal and addresses for the data queue memory 101. The numeral 115 denotes data written into the generator queue memory 103, that is, which data is output from the data memory 4 shown in FIG. 1 and input to the generator queue memory 103. The numeral 116 denotes a control signal and addresses for the generator queue memory 103.

The numeral 117 denotes data which is read out from the generator queue memory 103 and input to the multiplexer 104. The numeral 118 denotes output data from the multiplexer 104, which data is output to the processor unit 6 shown in FIG. 1. The numeral 113 denotes an input selection signal for the multiplexer 104. In response to this signal either one of the output data 112 from the data queue memory 101 and the output data 117 from the generator queue memory 103 is selected and then output from the multiplexer 104 as output data 118. The data stored in the data queue memory 101 corresponds to data which is output to the processor unit 6 in FIG. 1 through the multiplexer 104. This data is not accompanied with generation of data, so that its number will not be increased. On the other hand, the data stored in the generator queue memory 103 corresponds to data which is output to the processor unit 6 in FIG. 1 through the multiplexer 104, and this data is accompanied with generation of data. Therefore, the number of data is increased in the processor unit 6 shown in FIG. 1, so that the processor unit 6 assumes a busy state during such a period and becomes unable to receive any more input data.

An amount of data stored in the data queue memory 101 is limited by the capacity of the data queue memory. When the amount of data exceeds the upper limit, the data queue memory 101 is brought into a state of overflow so that the result of data processing may not be obtained correctly. Since an overflow is one type of fatal error, any further execution of the program becomes impossible and hence processing is interrupted at once when this overflow stage occurs. Thus, it is necessary to provide a means for preventing the interruption of processing before the overflow happens. In order to avoid the interruption of processing, read-out from the generator queue memory 103 should be forbidden in the case there is a possibility that the data queue memory 101 may overflow. The possibility of overflow will be caused when the sum of the amount of data stored in the data queue memory 101 and the maximum amount of data generated from output data exceeds the capacity of the data queue memory 101. Accordingly, the memories should be controlled in such a manner that read-out of data from the generator queue memory 103 is stopped and read-out of data from the data queue memory 101 is started instead.

In the case there is no possibility of overflow, read-out from the generator queue memory 103 is given higher priority than read-out from the data queue memory 101 so as to prevent the reduction of performance which results from the absence of data in the data queue memory 101.

Figure 4:
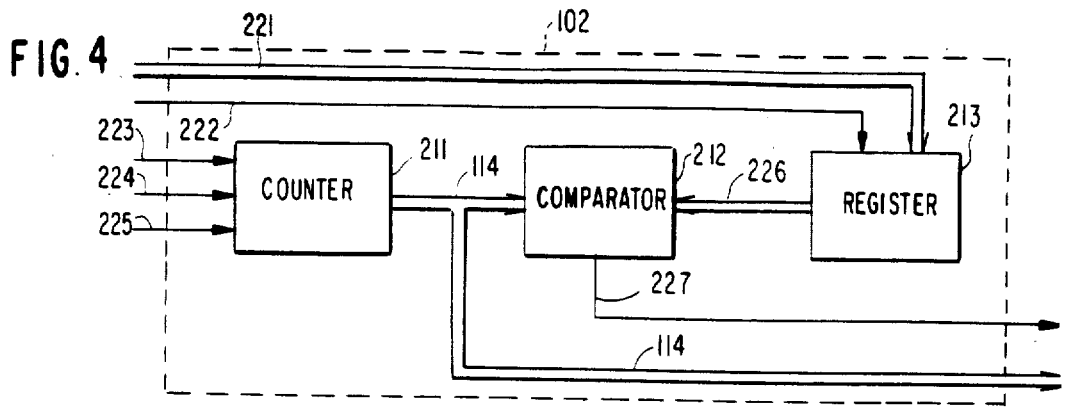
FIG. 4 is a block diagram showing one embodiment of a queue memory control circuit in FIG. 3.

FIG. 4 shows a detailed block diagram of the queue memory control circuit 102 shown in FIG. 3. The circuit 102 includes therein a counter 211, a comparator 212 and a register 213. The reference numeral 221 denotes data written into the register 213 and 222 denotes a write pulse fed to the register 213. An upper limit setting value for preventing an overflow in the data queue memory 101 is preset into the register 213 by the write pulse 222. Through the subsequent processing, the present value remains unchanged. A reset signal 223 is to clear the counter 211 prior to processing. The numeral 224 denotes a clock signal for the counter 211. With an up/down switching signal 225 assuming the up state, a value of the counter 211 is incremented by one when the clock signal 224 is input to the counter 211. Meanwhile, with the up/down switching signal 225 assuming the down state, a value of the counter 211 is decremented by one when the clock signal 224 is input to the counter 211. The value of the counter 211 indicates the number of data presently stored in the data queue memory 101 shown in FIG. 3. Thus, upon writing into the data queue memory 101, the value is incremented by one, while upon read-out from the data queue memory, the value is decremented by one. The reference numeral 226 denotes data read out from the register 213, that is, the upper limit setting value as mentioned above. The comparator 212 makes a comparison between the output data 114 from the counter 211 and the output data 226 from the register 213. A a result of the comparison, if the output data 114 from the counter 211 is larger, there issues a queue memory switching signal, that is, a signal 227 for forbidding read-out from the generator queue memory 103. Upon this signal 227, read-out from the generator queue memory 103 is forbidden and priority is given to read-out from the data queue memory 101.

As described hereinabove, the data processing machine of this invention is characterized in that for the purpose of preventing an overflow in the queue memory allowing data to wait for another, there is included the queue control circuit which monitors an amount of data stored in the queue memory and which controls read-out from the queue memory to avoid occurrence of the overflow. More specifically, data accompanied with generation of data and another data accompanied with no generation of data are separately stored in the different queue memories, and read-out from the generator queue memory for storing the data accompanied with generation of data is controlled in accordance with an amount of data present in the data queue memory for storing the data accompanied with no generation of data. This control is performed so as to forbid read-out from the generator queue memory when the sum of the maximum amount of data generated at one time and the amount of data stored in the data queue memory exceeds capacity of the data queue memory. As a result, the need for reforming the program due to occurrence of an overflow error can be eliminated, thus resulting in an effect that programs can be desirously arranged without considering the possibility of overflow.

The above shows an example of a structure in which an overflow in the queue memory is prevented beforehand by controlling read-out from the queue memory in accordance with an amount of data stored therein (particularly an amount of data sent to the processor unit). According to this structure, it becomes possible to execute processing with no interruption, because the queue memory will never fall into the overflow state even if the processor unit becomes busy.

Meanwhile, the present invention can provide another effect such that a multiprocessor system is arranged with ease by serially connecting a plurality of data processing modules shown in FIG. 1. FIG. 5 shows a block diagram of such an arranged system. In this embodiment, three modules 511, 512 and 513 are serially connected through unidirectional pipe line buses 521, 522, 523 and 524. Control signals 531, 532, 533 and 534 fed in the direction opposite to a flow of the data are input to and output from the modules, respectively.

Adjacent processor modules can be directly connected to each other without the need for any attached external circuit, so that an increase in the number of processor modules can easily realize the improved performance corresponding to that number. Such a structure in which a plurality of processor modules are directly connected in series, will be now referred to as multistage connection. A problem encountered in the multistage connection is how to allocate the required processings to the respective processor modules. In other words, it is necessary to find an allocation method which ensures the higher performance, without producing fear of overflow in the within each processor module. There are difficulties in finding a proper allocation method meeting such a demand only from the view point of a flow of operations, and hence backup is necessary from the view point of hardware. In the processor system including the multistage connection, with the respective processor modules having a large variation in their processing times, data is jammed in the processor module having a longer processing time, so that there occurs an overflow in the queue memory of that processor. However, an adjustment of the data processing amount in each processor module to ensure no possibility of overflow is difficult in general. It is necessary, therefore, to trace a flow of data in detail by a simulator and to find a proper flow of data, by a method of trial and error, which will never exceed the capacity of the queue memory even momentarily. This procedure leads to a great burden for users and is very difficult without the aid of a simulator. In order to prevent the queue memory from falling into the overflow state, data must not jam in the pipe line between each adjacent modules. When the processor modules are serial connected into multistages, it can be proposed that the module located nearer to the end of the multistages is made to have the lesser processing amount, thereby to improve a flow of data. But in the case of including a bus connected into a ring shape, the positional relation among the processor modules becomes indefinite and hence allocation of processing amounts to the respective processor modules becomes difficult. In terms of the performance, it is preferable to uniformly allocate the processing amount to the respective processor modules, but this may produce an overflow in the queue memory.

According to the present invention, an amount of data stored in the queue memory is monitored at all times and data input from the external circuit is temporarily forbidden when the monitored data amount exceeds an upper limit preset with respect to the capacity of the queue memory, thus restraining the generation of data in the previous processor module. As a result, the remaining processor modules can be controlled to operate at a speed which is suitable for the processor module having the largest processing amount and the lowest processing speed among all of the connected modules. In other words, the present invention is able to provide a processor system which can perform control of the multistage connection.

Hereinafter one embodiment of the processor system will be described by referring to FIG. 6.

The system according to this embodiment includes therein a counter for counting an amount of data stored in the queue memory, a comparator for judging whether or not a value of the counter exceeds an upper limit, that is, a value of (capacity of the queue memory)—(the number of latches constituting the pipe line), and a control circuit adapted to forbid input from the external circuit in accordance with the output from the comparator.

Figure 6:
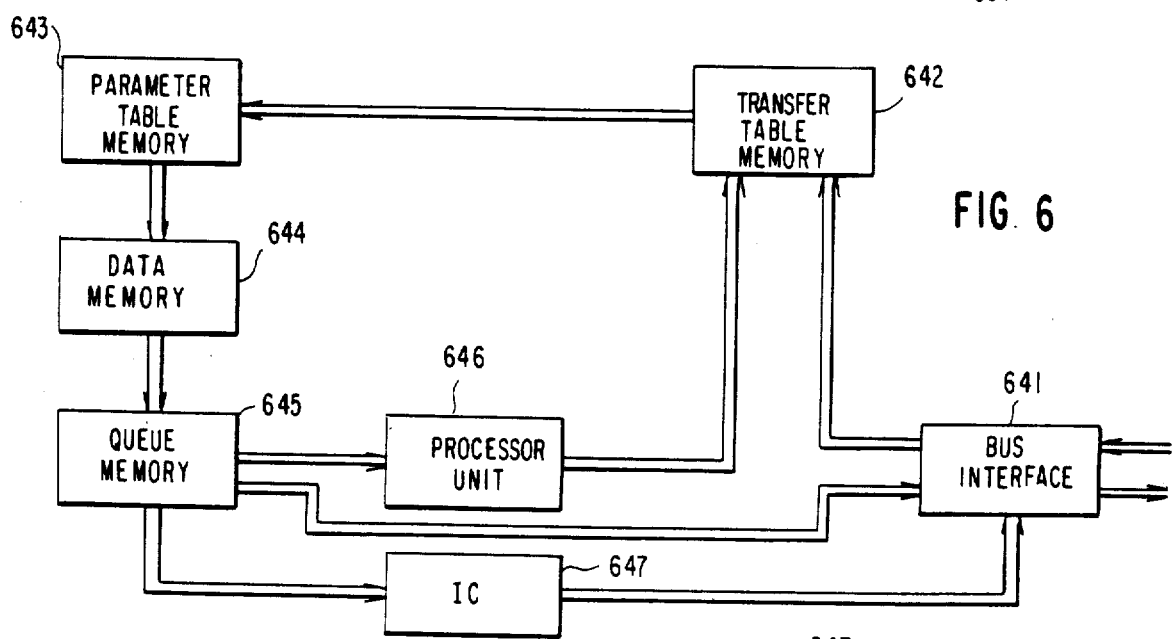
FIG. 6 is a block diagram of a data processing machine according to another embodiment of the invention.

FIG. 6 shows a block diagram of one module. This module includes therein a bus interface (BI) 641, a transfer table memory (TT) 642, a parameter table memory (PT) 643, a data memory (DM) 644, a queue memory (QM) 645, a processor unit (PU) 646 and an input data control circuit (IC) 647. These members TT 642, PT 643, DM 644, QM 645 and PU 646 are connected into a ring shape with a pipe line bus in the sequence as illustrated in the drawing. Destination addresses for data are stored in the TT 642. The PT 643 is accessed with the destination address output from the TT 642 and stores therein instructions transferred from a host processor in the initialized state. The DM 644 serves as a memory for temporarily storing one half of the input data for dyadic operation. The QM 645 serves a a queue memory for temporarily storing data from the DM 644. The PU 646 is a processor unit which has a function to perform dyadic operation (i.e., operation for two kinds of input data) or monadic operation (i.e., operation for one kind of input data) with respect to the output from the QM 645. The BI 641 is an interface circuit for controlling the input/output transfer of data between the pipe line bus and the external bus. The PT 643 has such additional functions as to permit generation, extinction and branching of data, counting of incoming data, dyadic control, and address generation for the DM 644. The input data control circuit 647 controls the BI 641 upon checking the state of the QM 645.

Input/output treated in the BI 641 include module number setting data, template setting data, template reading data, data memory setting data, data memory reading data, resetting data, ineffective data, passing data, executing data, error status data, and processing data.

The module number setting data comprises only the module number and is to set the module number into a module number register within the bus interface 641 when reset. After once being set into the module number register upon resetting, the content of the module number register remains unchanged until a reset signal becomes newly active. The content of the module number register is compared with the module number of data taken into the processing module after resetting. The template setting data comprises the module number, address data for the transfer table memory 642, a data value to be written into the transfer table memory 642, address data for the parameter table memory 643 and a data value to be written into the parameter table memory 643. The template setting data is to set template data into the transfer table memory 642 and the parameter table memory 643. The template data represents the content and procedure of processing and is normally transferred into the internal processing module, that is, into the transfer table memory 642 and the parameter table memory 643, from a host processor on the outside at the starting of serial processing. The template reading data comprises the module number, address data for the transfer table memory 642 and address data for the parameter table memory 643. The template reading data is to read the template data set in the transfer table memory 642 and the parameter table memory 643. As the module number for the data there is used the number of module which is intended to read the template data therefrom. Moreover, the template reading data can be utilized to check the content of the template data in the event there occurs an error. After reading out the template data, the template reading data serves to output the read-out value to the external circuit, but the module number at this time is replaced of the specified module number (e.g., 1) in order to discriminate it from other data.

The data memory setting data comprises the module number and a data value, and is to write the data value into the data memory 644. Addresses used for writing the data value into the data memory 644 are generated from the parameter table memory 643 while being sequentially incremented one by one from 0. The data memory reading data comprises the module number and address for the data memory 644. The data memory reading data is to access the data memory 644 with the address for the data memory 644 included therein and to output the read-out data value to the external circuit.

The resetting data comprises only the module number and is used to release the error state after such a state has occured within the processing module. The error state results from an overflow error in the queue memory 645. If this error occurs, the data input to the bus interface 641 is not taken into the processing module and is extinguished. In case the resetting data is input to the bus interface 641, however, the error state is released and normal processing will be continued after that. Other than the above function to reset the error state, the resetting data has another function to initialize the state within the processing module, that is, to clear counters and memories included therein. The resetting data disappears within the bus interface 641.

The ineffective data comprises only the specified module number (e.g., 0). This data will disappear within the bus interface 641, even if it should be input to the processing module.

The passing data represents such data as having therein the module number which does not coincide with the content of the module number register set at the time of resetting, and as not constituting the ineffective data as well as the module number setting data. The passing data input from the external data directly passes through the bus interface 641 and is then output to the external circuit. This is referred to as the bypassing of data.

The executing data comprises the module number, address data for the transfer table memory 642, a control bit, a code bit and a data value. The control bit is set when the result of operation in the processor unit 646 coincides with the designated condition. In the case where the control bit is set, address data in the transfer table memory 642 is changed upon the designation of a branching instruction by the processor unit 646. Stated differently, in such case the data will be processed in a manner different from the data where the control bit is not set. With the branching instruction not being designated, no change of processing will occur so that the control bit and the branching instruction are normally used as a pair. The branching instruction is used to change the flow of the processing in accordance with the operation result. The error status data has a function to inform the external circuit of the occurance of error, when there occurs an overflow error in the queue memory 645 within the processing module. The module number included in the error status data corresponds to the read-out content of the module number register set within the module which has been subject to the error.

The processing data comprises the module number, address for the transfer table memory 642, a control bit, a code bit and a data value. The prodessing data makes reference to the transfer table memory 642 and the parameter table memory 642. As a result, upon the presence of an output instruction, the processing data is combined with address data for the transfer table memory 642 and the module number obtained by referring to the transfer table memory 642 and the parameter table memory 643, and is then output to the external circuit.

Hereinafter there will be described in detail a flow of data in the operation processing.

The executing data comprises the module number, address data for the transfer table memory 642, a control bit, a code bit and a data value. This data is taken into the ring-shaped bus of pipe line mode from the external circuit via the bus interface 641 and is then sent to the transfer table memory 642. The data is allowed to be input from the external circuit into the processing module only on such conditions that the processor unit 6 is not under output operation, the number of data stored in the queue memory 645 is less than a certain value (e.g., 16 data), and the module number included in the input data coincides with the content of the module number register which has been taken therein at the time of resetting.

The data input from the external circuit to the bus interface 641 is added with a use bit within bus interface 641 and is then sent to the transfer table memory 642.

The transfer table memory 642 receives data from the bus interface 641 or the processor unit 646. The data input to the transfer table memory 642 comprises a data value, address data for the transfer table memory 642, a use flag and a template flag. The use flag is to indicate whether the data is effective or ineffective. The transfer table memory 642 checks both use flags of output data from the processor unit 646 and the bus interface 641, and then takes therein the data with its use flag assuming "1". In the case where both use flags assume "1". In the case where both use flags assume "1", the output data from the processor unit 646 is taken in with priority. The data in such a case where both use flags assume "0" will turn to ineffective data. This ineffective data passes through the transfer table memory 42, parameter table memory 643 and the data memory 644, and then it disappears before reaching the queue memory 645.

With the use flag assuming "1" and the template flag assuming "0", the transfer table memory 642 judges the input data as normal processing data, so that the transfer table memory 642 is accessed with the address for the transfer table memory 642 and then the read-out data is sent to the parameter table memory 643. With the use flag assuming "1" and the template flag assuming "1", the data is written into and read out from the transfer table memory 642 with the control bit.

The data written into the transfer table memory 642 comprises information to discriminate processings before and after the reference to the transfer table memory 642, and information to discriminate paired components from each other when addresses used for newly referring to the transfer table memory 642, addresses used for referring to the parameter table memory 643 and the data sent to the parameter table memory 643 are operated as a pair, respectively, after data processing in the processor unit 646.

The parameter table memory 643 is referred with the address for the parameter table memory 643, which is included in the data read out from the transfer table memory 642. The parameter table memory 643 mainly stores therein codes of instructions. Such codes include information to control data exchange where two data are operated as a pair, code information to designate the number of output data, the module number attached to the data taken out to the external circuit and the content of processing in the processor unit 646, and information for supervising the states such as reading/writing of the data memory 644, dyadic queue control of data or flow rate control thereof. Writing of data into the parameter table memory 643 is effected when the template flag is set. This data is divided into permanent information which content remains unchanged during normal processing and temporary information which constitutes address information for the data memory 644.

The parameter table memory 643 receives the use flag, template flag, control bit, instruction code and a data exchange signal from the transfer table memory 642, and it outputs a write enable signal to the data memory 644.

The data memory 644 is used for storing a queue in which the data having reaching in advance is allowed to temporarily wait until both data for dyadic operation (i.e., operating using two kinds of data as input) will be all present, a constant used for constant operation, a look up table, a transition table for processing the transition of states, and input/output data. The write enable signal for the data memory 644 is sent from the parameter table memory 643. With the instruction of dyadic operation being designated and both data being all present, input data from the parameter table memory 643 and read data from the data memory 644 are output to the queue memory 645 at the same time. The queue memory 645 comprises a data queue and a generator queue. The data queue serves as a memory for temporarily holding data in the case the processor unit 646 outputs a plural number of data or receives data from the bus interface 641, because the processor unit 646 becomes busy and is unable to receive any more input data at that time.

The generator queue receives starting data for generating a numerical value, the number of generated data and control information from the data memory, and it outputs data to the processor unit 646 upon checking the information indicative of whether or not the data queue has a vacant space more than a predetermined value (a half of the capacity of the data queue in this embodiment).

The processor unit 646 comprises arithmetic circuits which have various functions to permit arithmetic operation, logical operation, shift, comparison, bit inversion, priority encoding, branching, generation of numeric value, and copying.

The bit inversion means such processing as providing an output data value which has an inverted bit position with respect to an input data value.

In processing referred to as the priority encoding, a value of each bit included in the input data value is sequentially checked from a bit with highest priority to a bit with lowest priority. As a result of this check, when there appears a bit which assumes "1" for the first, the position of the first bit a which a "1" occurs is indicated in the form of binary integer and this is turned into the output data value.

The branching performs such processing that upon checking the control bit, the address for the template memory 642 included in the input data is directly output as the address for the template memory 642 included in the output data with the control bit assuming "0", while the address obtained by incrementing the address for the template memory 642 included in the input data is output as the address for the template memory 642 included in the output data with the control bit assuming "1".

The generation of numeric value performs such processing to check a data value in the input data, the number of generations and an increment value, then adds the increment value to the data value in the input data corresponding to the number of generations, and then issues the output data corresponding to the number of generations. This function is used in the case of including repetitive processing or including a need to generate addresses for the memory. On this occasion, the address for the transfer cable memory 642 in the output data remains unchanged and the address for the transfer table memory 642 in the input data is directly output.

The copying performs such processing that a data value in the input data and the number of copyings are checked and the data value in the input data is directly copied into the output data corresponding to the number of copyings. At this time, the address for the transfer table memory 642 included in the output data assumes a value which is obtained by incrementing the address for the transfer table memory 642 in the input data one by one in a sequence of outputs.

The number of input data to the processor unit 646 is one or two, while the number of output data can be designated to have a range of 1 to 16. Processing where the number of input data is one is called monadic operation, and processing where the number of input data is two is called dyadic operation. In the case of monadic operation, it is not necessary for data to wait, because the number of input data is one, while in the case of dyadic operation, the data having reached the data memory 644 in advance is stored in a dyadic queue within the data memory 644 for waiting because it is impossible to execute processing until both data will be completely present. More specifically, when the delayed data has reached the data memory 644, it is sent to the processor unit 646 lthrough the queue memory 645 together with the former data read out from the dyadic queue within the data memory. Whereupon, the operation will be started. In other words, the dyadic operation will be subject to execution control in a data flow mode.

When the number of output data is two or more, a busy flag is set while being output so as to inhibit data from being input from the queue memory 645.

Figure 7:
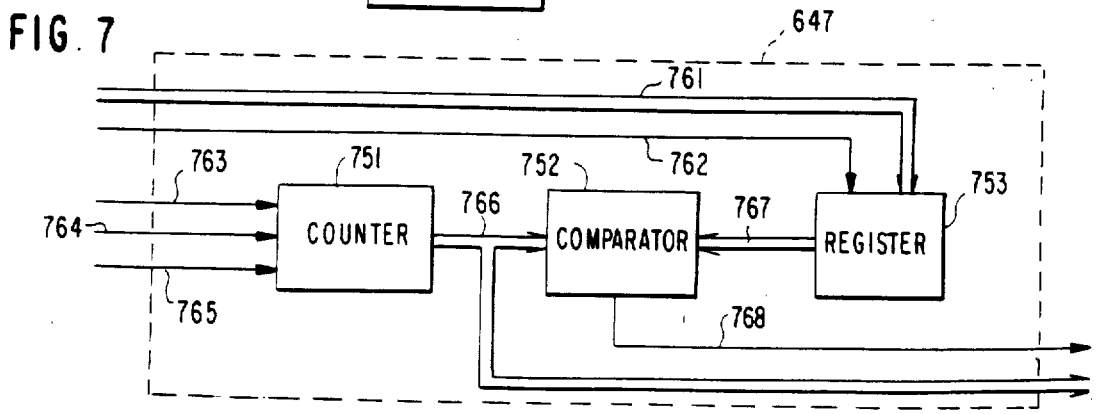
FIG. 7 is a block diagram showing one embodiment of an input data control circuit in FIG. 6.

FIG. 7 shows a block diagram showing one embodiment of the input data control circuit 647 shown in FIG. 6.

This newly proposed circuit 647 includes therein a counter 751, a comparator 752 and a register 753. The reference numeral 761 denotes data written into the register 753, and 762 denotes a write pulse fed to the register 753. An upper limit setting value for preventing an overflow in the queue memory 64 shown in FIG. 6 is preset into the register 753 by the write pulse 762. Through the subsequent processing, the preset value remains unchanged. The reference numeral 763 denotes a reset signal, which is to clear the counter 751 prior to processing. The numeral 764 denotes a clock signal for the counter 751. With an up/down switching signal 765 assuming the up-state, a value of the counter 751 is incremented by one when the clock signal 764 is input to the counter 751. Meanwhile, with the up/down switching signal 765 assuming the down-state, a value of the counter 751 is decremented by one when the clock signal 764 is input to the counter 751. The value of the counter 751 indicates the number of data presently stored in the queue memory 645 shown in FIG. 6. Thus, upon writing into the queue memory 645, the value is incremented by one, while upon read-out from the queue memory 645, the value is decremented by one. The reference numeral 766 denotes data read-out from the counter 751 and sent to the comparator 752 and the queue memory 645 in FIG. 6. The numeral 767 denotes data read-out from the register 753, that is, the upper limit setting value as mentioned above. The comparator 752 makes a comparison between the output data 766 from the counter 751 and the output data 767 from the register 753. As a result of the comparison, if the output data 766 from the counter 751 is larger, there issues a data input inhibition signal 768 which is output to the bus interface 641 shown in FIG. 6. This data input inhibition signal 768 is used as an input control signal in the bus interface 641, so that data input is forbidden while the data input inhibition signal 768 is active, that is, while the number of data stored in the queue memory 645 exceeds the aforesaid upper limit. As the data input inhibition signal 768 becomes inactive, data input will be started once again.

The reason why a difference between the capacity of the queue memory 645 and the number of latches constituting the pipe line is adopted as the upper limit value is as follows. The data in the queue memory 645 includes data to be output to the external circuit through the bus interface 641. At ths time, if the bus in the external circuit is in the busy state, the data is unable to be output. But even on such an occasion, the latches constituting the pipe line continue the operation thereof, so that data in an amount corresponding to the number of latches is caused to flow into the queue memory 645 even with data input from the external circuit being inhibited, thus producing a possibility of overflow. Therefore, the upper limit value is determined to avoid such a possibility.

According to the foregoing control, it becomes possible to prevent the queue memory 645 from falling into the overflow state. Further, in the case of multistage connection, data is able to flow at a speed fit for the processor module having the lowest processing speed without the need for taking special consideration of the allocation of processings.

As described hereinabove, the data processing system according to this embodiment is characterized in that for the purpose of preventing an overflow in the queue memory allowing data to wait for another, there is included the input data control circuit which monitors an amount of data stored in the queue memory and which inhibits input of data temporarily to avoid occurrence of the overflow. This control is performed so as to forbid input of data when the sum of the maximum amount of data generated at one time and the amount of data stored in the queue memory exceeds the capacity of the queue memory. As the number of data stored in the queue memory becomes less than the value of (capacity of the queue memory)—(data amount generated at one time), data input is released from its inhibited state and is then started once again. As a result, the need for reforming the program due to occurrence of an overflow error can be eliminated, with the result that programs can be desirously arranged taking no consideration of the possibility of overflow.

Figure 8:
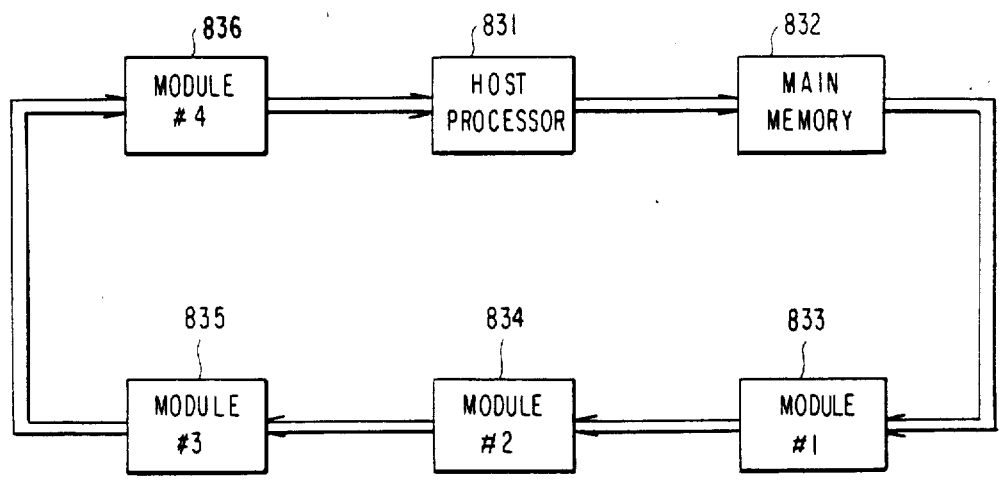
FIG. 8 is a block diagram of multiprocessor system comprising the data processing machines of the invention, a host processor and a main memory.

The data processing machine of modular type as shown in FIGS. 1 to 6 is programmable and easy in its bus connection, so that it is also fit for a composite processing system. In addition, since transfer of instructions to each module (that is, setting of the initial state) can be performed with ease, a general microcomputer is able to be used as a host processor. FIG. 8 shows a block diagram of the system and there will now be described the structure and operation thereof.

FIG. 8 is a block diagram showing an embodiment in which a plurality of modules are connected through a ring-shaped bus under pipe line control. As will be seen from the drawing, a host processor 831, a main memory 832 and four modules (#1 to #4) 833 to 836 are coupled into a ring shape with the unidirectional bus. The respective modules #1 to #4 have the structure as illustrated in FIG. 1 or 6, and they serve as auxiliary processing machines for the host processor 831. When reset, the module number is loaded into a module number register within each module. Among data flowing through the bus, only the data which coincides with the loaded module number is taken into that module, while other data are controlled to pass through that module.

At first, initial setting data is sent from the host processor 831 to the respective modules 833 to 836. This will be now described by referring to FIG. 1. The initial setting data is to first set such data as instructions or control information necessary for processing into the parameter table memory 3, the data memory 4 and the transfer table memory 2. In particular, the data to be set in the parameter table memory 3 and the transfer table memory 2 is referred to as a template. The subsequent processing will be performed in accordance with this template. Now, the description is continued with reference again to FIG. 8. Here, assuming that data such as image information has been input into the main memory 832 previously, this data is read out from the main memory 832 and subject to the desired processing in the respective modules 833 to 836, and then the result is written into the main memory 832. The respective modules 833 to 836 are connected through the bus under pipe line control. In order to execute processing with higher efficiency, it is necessary to divide and allocate processings to the respective modules in accordance with the processed programs. Each module has a composite processing function and is able to set the template therein, so that various processing functions different from one another may be set in the modules, respectively. In the case where all of the modules have no vacancy in their processing times and processings can be allocated without producing a jam on the pipe line, most efficient processing is obtained and a processing speed is increased up to the maximum value. To realize this, there may be used the circuits as shown in FIGS. 2, 3, 4 and 7. Various functions can be set into each module by the host processor in a programmable manner, thus permitting the allocation of functions with no loss and high-speed processing. Accordingly, the structure as mentioned above has a feature that a high-speed in the pipe line mode and parallel execution control in the data flow are effectively combined, and hence the structure can realize high-speed processing with ease just by connecting a plurality of identical modules in series.

As described in the above, a feature of the foregoing system resides in permitting selection of functions in the arithmetic part with a composite function in response to the desired processing, and the system then makes it possible to reduce a vacancy in the arithmetic part for the connection using the bus. As a result, in comparison with the prior art in which a plurality of modules each having a fixed single function are connected to constitute the pipe line, the performance can be slightly improved. It is enough to prepare one kind of module and this is preferable for a tendency toward LSI. Moreover, the module structure can be aranged so as to fit for a flow of data and hence the number of collisions of data on the bus is reduced, thus making system design very easy.

Here, each of the processor modules is to execute predetermined serial arithmetic processing with the use of the bus therein independently, so there is a possibility that the modules may have their processing times different from one another. On this occasion, when plural modules with their processing times having a great difference therebetween are connected through a common bus to constitute the system, this produces the module in which an input and output amount of data are different from each other. The queue memory serves as a memory to ensure that such difference in the input and output amounts is self-controlled in that module and there occurs no adverse influence upon other modules. However, since the capacity of the queue itself is fixed based on the hardware, it is unable to control a data flow exceeding the fixed capacity. Such situation leads to a need that on the basis of the module having the maximum processing amount, the performance (time necessary for input and output of data) of other modules is reduced, thereby to make a substantially uniform processing flow as a whole. This need can be satisfied with the aid of software, but this solution is not preferable because of an increase in functions of the host processor used for supervising the system and further an increase in the R&D cost of software. Consequently, there is required such a function as to permit self-control of data transfer between the modules with no aid of software. Hereinafter there will be described one embodiment of a hardware circuit (or a data flow rate control circuit) capable of self-controlling the data transfer.

For example, when computing the following equations (Eq 1)

$$u_i = x_i + y_i \times z_i \text{ (where } i = 1, \ldots n\text{)}$$

$$v_i = x_i - y_i \times z_i \qquad \text{(Eq 1)}$$

such a program is assumed that an information processing machine (module) A sends $x_i$, $y_i$ and $z_i$ to another information processing machine (module) B in sequence, and the machine B sends the results of operation $u_i$ and $v_i$ to the machine A. At this time, a set of three data as a unit is transferred from the information processing machine A to B n times, while a set of two data as a unit is transferred from the information processing machine B to A n times. According to the proposed data flow rate control circuit, attention is directed to one of the elements included in a set of data as a unit, for example $z_i$ and $v_i$, so as to prevent an inflow of data exceeding the capacity of the respective information processing machines in such a manner that an absolute value of the difference between the number of $z_i$'s sent from the information processing machine A to B and the number of $v_i$'s sent from the information processing machine B to A is monitored from time to time, and then this value is controlled not to exceed a given constant. Here, the three data $x_i$, $y_i$ and $z_i$ are given with different discriminators such as '0', '1' and '2', respectively, while the two data $u_i$ and $v_i$ are similarly given with different discriminators such as '0' and '1'. In the above embodiment, therefore, it will be necessary to count the number of transfers of data having the discriminator '2' among the transferred data from the information processing machine A to B as well as the number of transfers of data having the discriminator '1' among the transferred data from the information processing machine B to A.

Figure 9:
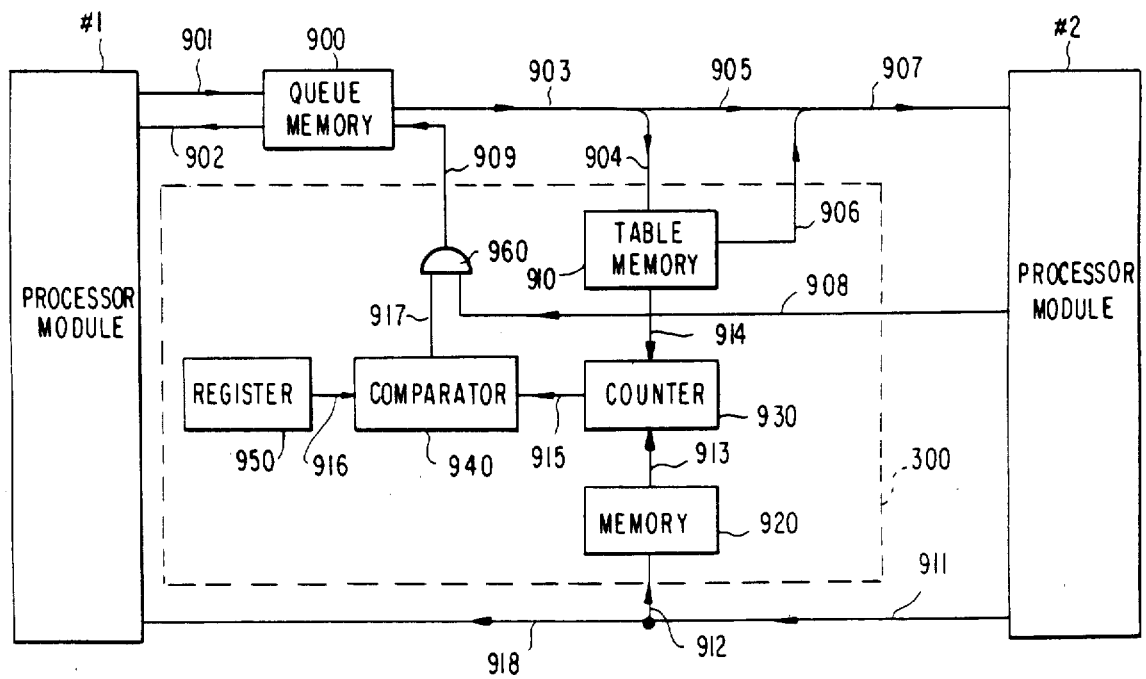
FIG. 9 is a block diagram showing one embodiment of a data flow rate control circuit effective in a system including the multi-coupled data processing machines of the invention, and showing the connection between two data processing machines.

FIG. 9 shows a block diagram of the proposed data flow rate control circuit and a pair of information processing machines. Now, assume such a case that data is required to be sent from an information processing machine #1 to another information processing machine #2 and a queue memory 900 with a FIFO function has therein a data storing area. With a data receive enable signal being output on a signal line 902, the information processing machine #1 outputs data to a data line 901, the data comprising a data discriminator and a data value. The queue memory 900 holds the thus output data temporarily. When the temporarily loaded data is read out from the queue memory 900 to a data line 903, the data discriminator is used to access a table memory 910 through a data line 904. As a result, a discriminator for new data having been stored in the table memory 910 is read out to a data line 906, while an increase monitor bit is read out to a signal line 914. A data value fed to a data line 905 and the discriminator for new data fed to the data line 906 are input to the information processing machine #2 through a data line 907 together. Meanwhile, data input from the information processing machine #2 through a data line 911 is directly fed to the information processing machine #1 through a data line 918. Among the data on the data line 918, the data discriminator is used to access a memory 920 through a data line 912 and then the accessed data is output to a signal line 913 as a decrease monitor bit. A counter 930 is incremented by one when the increase monitor bit is output to the signal line 914, and is decremented by one when the decrease monitor bit is output to the signal line 913. An absolute value of the counter 930 is output to a data line 915 and then compared with the output from a register 950 by a comparator 940. When the value on the data line 915 is less than the value on a data line 916, a value of '1' is output to a signal line 917. If the information processing machine #2 is under the state in which it is presently able to receive data, a value of '1' is output to a signal line 908. At the same time, with a value of '1' being output to the signal line 917, an output signal line 909 of a logical product circuit assumes '1'. The queue memory 900 continues to read only when '1' is output to the signal line 909. In this embodiment, an output part corresponds to the queue memory 900, while an output control part corresponds to a block 300 shown by a broken line.

Figure 10:
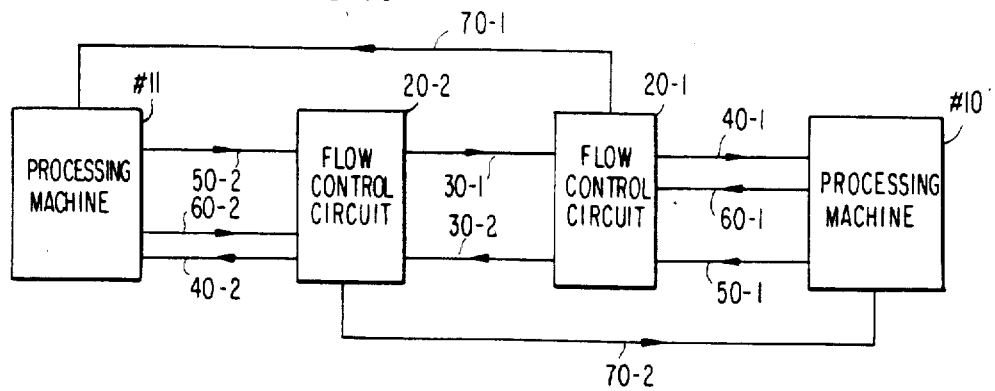
FIG. 10 is a block diagram of the system including the multi-coupled data processing machines of the invention, showing one embodiment which permits mutual control of a data flow rate between the machines.

FIG. 10 is a block diagram showing another embodiment.

This embodiment represents the case that data transfer is mutually controlled between a pair of two information processing machines.

When there exists data to be given from an information processing machine #11 to the other information processing machine #10 and a flow rate control circuit 20-1 outputs the data receiving enable state to a data line 70-1, data comprising a data discriminator and a data value is output from the information processing machine #11 to a data line 50-2. The data discriminator has a function to discriminate data individually and the information processing machine #10 will be subject to different processing for each discriminator. The data input from the data line 50-2 is added in a flow rate control circuit 20-2 with an increase monitor bit in accordance with the discriminator and is then input to the flow rate control circuit 20-1 through a data line 30-1 to be stored therein temporarily. In the flow rate control circuit 20-1, when the data input enable state is output from the information processing machine #10 to a signal line 60-1, the temporarily stored data from line 30-1 is fed to the information processing machine #10 through a data line 40-1. Transfer of data from the information processing machine #10 to #11 is also performed in a similar manner. The flow rate control circuits 20-1 and 20-2 are composed of circuits of the same construction.

Figure 11:
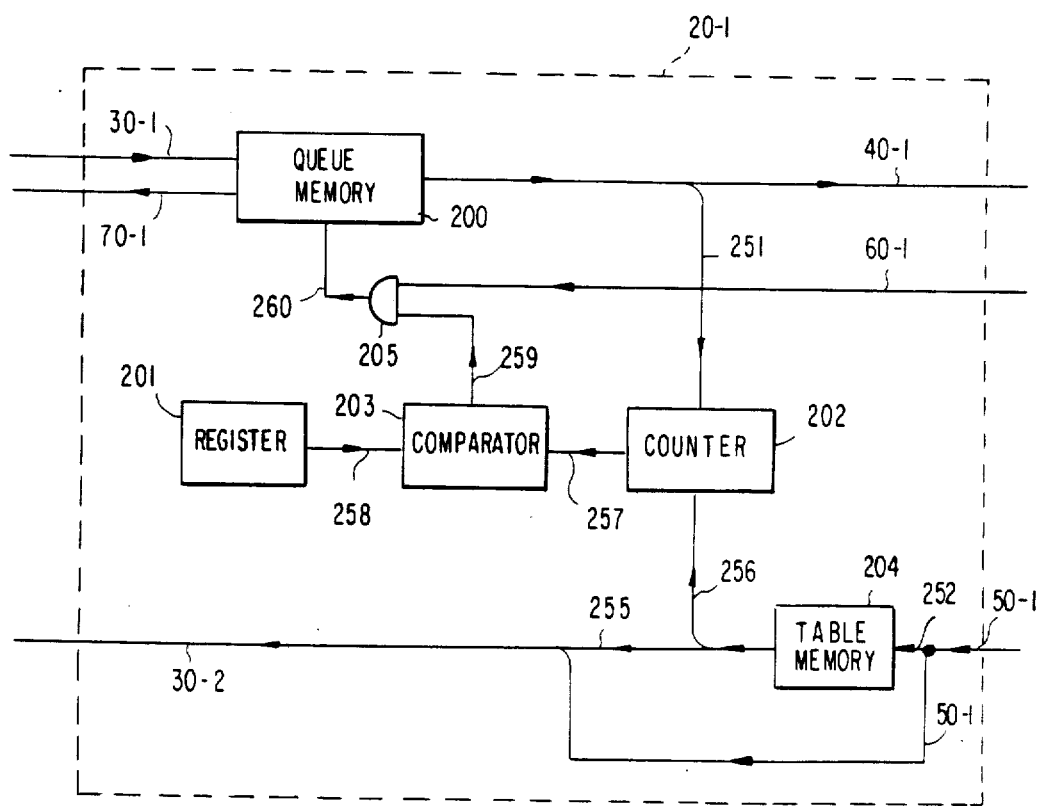
FIG. 11 is a block diagram showing one embodiment of a data flow rate control circuit in FIG. 10.

FIG. 11 is a block diagram showing one example of the flow rate control circuit 20-1 in more detail.

A table memory 204 is accessed with the discriminator input through the data line 50-1, while a decrease and increase monitor bit are output to signal lines 256 and 255, respectively. The input data on the data line 50-1 and the increase monitor bit on the signal line 255 are fed to the flow rate control circuit 20-2 in FIG. 10 through the data line 30-2. With the decrease monitor bit on the signal line 256 assuming '1', a counter 202 is decremented by one. The increase monitor bit and data input to the data line 30-1 from the flow rate control circuit 20-2 in FIG. 10 are temporarily stored in a queue memory 200. When the queue memory 200 is under the state capable of storing data therein, the data receiving enable state is output to the information processing machine #11 in Fig. 10 through the signal line 70-1. The increase monitor bit read out from the queue memory 200 is fed through a signal line 251 to increment the counter 202 by one, while the data therefrom is fed to the information processing machine #10 in FIG. 10 through the data line 40-1.

An absolute value of the counter 202 is output to a data line 257 and is then compared with the value of the register 201 by a comparator 203. If the value on the data line 258 is largerr than the value on the data line 257, a value of '1' is output to a data line 259. In the opposite relation, a value of '0' is output thereto. A signal indicating the data input enable state is input from the information processing machine #10 in FIG. 10 through the signal line 60-1, then the logical product of the value on the signal line 259 and the value on the signal line 60-1 is obtained by a logical product circuit 205, and then the result is output to a signal line 260. More specifically, in the state where the value of the register 201 is larger than the absolute value of the counter 202 and the signal indicating the data input enable state is output to the signal line 60-1, a value of '1' is output to the signal line 260 and the data is read out from the queue memory 200.

Alternatively, although initial data is set into the register 201 and the table memory 204 in advance, the register 202 and the table memory 204 may be replaced of a constant generator and a read-only memory, respectively.

By using the data flow rate control circuit as stated above, it becomes possible to automatically monitor the processing state of the respective information processing machines and to cause processing to be effected synchronously therebetween in the case of data processing among two or more information processing machines, thus eliminating a need for software control.

According to this embodiment, as is clear from the above description, there is obtained a data flow rate control circuit used for transferring data between at least two information processing machines A and B each treating data consisting of a discriminator and a data value, which circuit comprises; an output part holding data input from the information processing machine A and operating on a FIFO basis to output the held data to the information processing machine B; and an output control part for counting the number of data fed from the information processing machine B to the information processing machine A while checking the data discriminator therein, counting the number of data output from the output part to the information processing machine B while checking the data discriminator therein, and then controlling output from the output part so as to maintain a difference between both the counted values within a predetermined value.

As fully described hereinbefore, according to the data processing machine of this invention, the sequence and timing for processing of data can be changed in a programmable manner, thus permitting pipe line processing with variable length and high-speed data processing. The machine includes therein a closed loop bus structure, whereby multiple loop operation and copying operation can be executed with ease. There are included functions to extinguish ineffective data or bypass useless data, so that the program may be processed with an operation flow having no loss. Since the machine includes therein a means to branch a data flow in accordance with data or the result of operation, it becomes possible with a simple circuit loop to execute such processing as corresponding conditional branch processing or so in the program. Further, both an amount of incoming data and an amount of outgoing data are able to be monitored and controlled, whereby data can be transferred to and from external processors or memories with neither loss nor error. Moreover, the machine can be used to arrange a system having a three-ring structure comprising an outer ring, an inner ring and an operation ring, so that it is highly suitable for multiprocessing. In addition, there can be obtained a novel microprocessor by which the treated data and the associated instructions are controlled to be separated from each other or coupled together in a programmable manner as required, thus providing a great effect in the art of data processing where a large number of data has to be treated.

What is claimed is:

1. A data processing machine comprising a first memory for storing destination addresses designating locations of instructions used in data processing, a second memory accessed with the destination addresses output from said first memory and storing said instructions, an arithmetic means for executing an arithmetic operation according to the instructions read out of said second memory, a third memory for temporarily storing first data which has reached said third memory from said second memory in advance of a second data which is needed with said first data for an arithmetic operation, until said second data reaches said third memory, a queue memory for storing data read out from said third memory waiting to be processed in said arithmetic means and data waiting to be transferred to the outside of said data processing machine, said queue memory separately storing data to be used in the operation of an instruction which does not increase the amount of data to be stored in said queue memory and data to be used in the operation of an instruction which will increase the amount of data to be stored in said queue memory, an interface means for transferring data received from the outside of said data processing machine to said first memory and transferring data from said queue memory to the outside of said data processing machine, and bus means for coupling said first memory, said second memory, said third memory, said queue memory and said arithmetic means in a ring shape, and control means coupled to said interface means and said queue memory for monitoring an amount of data stored in said queue memory and for inhibiting the transfer of data from said interface means to said first memory when the amount of data in said queue memory exceeds a predetermined amount.

2. A data processing machine comprising a first memory for storing destination addresses designating locations of instructions used in data processing, a second memory accessed with the destination addresses output from said first memory and storing said instructions, an arithmetic means for executing an arithmetic operation according to the instructions read out of said second memory, a third memory for temporarily storing first data which has reached said third memory from said second memory in advance of a second data which is needed with said first data for an arithmetic operation, until said second data reaches said third memory, a queue memory for storing data read out from said third memory waiting to be processed in said arithmetic means and data waiting to be transferred to the outside of said data processing machine, an interface means for transferring data received from the outside of said data processing machine to said first memory and transferring data from said queue memory to the outside of said data processing machine, and bus means for coupling said first memory, said second memory, said third memory, said queue memory and said arithmetic means in a ring shape, first control means monitoring the amount of data in said queue memory and inhibiting an output of said queue memory to said arithmetic means when said monitored amount exceeds a predetermined amount, and second control means coupled to said interface means and said queue memory for monitoring an amount of data stored in said queue memory and for inhibiting the transfer of data from said interface means to said first memory when the amount of data in said queue memory exceeds a predetermined amount.

* * * * *

UNITED STATES PATENT AND TRADEMARK OFFICE
CERTIFICATE OF CORRECTION

PATENT NO. : 4,674,034

DATED : June 16, 1987

INVENTOR(S) : MASAO IWASHITA & TSUTOMU TENMA both of Tokyo, Japan

It is certified that error appears in the above-identified patent and that said Letters Patent is hereby corrected as shown below:

Column 6, line 45, after "unit" insert --(--.

Column 7, line 45, delete "initial ize" and insert --initialize--.

Column 10, line 24, after "is" insert --a--;

Column 10, line 25, change "copying" to --copyings--.

Column 15, line 18, After "A" delete "a".

Column 16, line 13, after "the" insert --data queue memory--.

Signed and Sealed this

Twenty-eighth Day of June, 1988

Attest:

DONALD J. QUIGG

*Attesting Officer*    *Commissioner of Patents and Trademarks*